United States Patent
Vigeant et al.

(10) Patent No.: US 8,641,082 B2
(45) Date of Patent: Feb. 4, 2014

(54) AIRBAG MODULE CASE

(75) Inventors: Peter L. Vigeant, Ste. Genevieve, MO (US); Adam D. Hardin, Festus, MO (US); April Hamilton, Jackson, MO (US); Lionel K. Cureau, Perryville, MO (US)

(73) Assignee: Toyoda Gosei Co. Ltd., Inazawa, Aichi (JP)

(*) Notice: Subject to any disclaimer, the term of this patent is extended or adjusted under 35 U.S.C. 154(b) by 0 days.

(21) Appl. No.: 13/615,771

(22) Filed: Sep. 14, 2012

(65) Prior Publication Data
US 2014/0008899 A1 Jan. 9, 2014

Related U.S. Application Data

(60) Provisional application No. 61/669,491, filed on Jul. 9, 2012, provisional application No. 61/670,748, filed on Jul. 12, 2012.

(51) Int. Cl.
*B60R 21/16* (2006.01)

(52) U.S. Cl.
USPC .................. 280/728.2; 280/730.1

(58) Field of Classification Search
USPC .......... 280/728.2, 728.3, 730.1, 732
See application file for complete search history.

(56) References Cited

U.S. PATENT DOCUMENTS

| | | | | |
|---|---|---|---|---|
| 5,295,707 | A * | 3/1994 | Satoh et al. | 280/728.2 |
| 6,712,384 | B2 * | 3/2004 | Abe | 280/730.1 |
| 7,448,642 | B2 * | 11/2008 | Boggess et al. | 280/728.2 |
| 7,641,221 | B2 * | 1/2010 | Boggess et al. | 280/728.2 |
| 7,874,587 | B2 * | 1/2011 | Miki et al. | 280/752 |
| 8,016,317 | B1 * | 9/2011 | Bruyneel et al. | 280/728.2 |
| 8,033,566 | B2 * | 10/2011 | Boggess et al. | 280/728.2 |
| 2011/0227318 | A1 * | 9/2011 | Schorle et al. | 280/728.2 |
| 2012/0038132 | A1 * | 2/2012 | Rick | 280/728.2 |

* cited by examiner

*Primary Examiner* — Faye M. Fleming
(74) *Attorney, Agent, or Firm* — Carlson, Gaskey & Olds P.C.

(57) ABSTRACT

An exemplary airbag case includes a floor that is configured to receive an airbag module, a wall extending away from the floor, and a plurality of reinforcement features each extending without interruption from the floor to the wall.

23 Claims, 6 Drawing Sheets

AIRBAG MODULE CASE

CROSS-REFERENCE TO RELATED APPLICATIONS

This Application claims priority to U.S. Provisional Application Nos. 61/669,491 and 61/670,748, which were filed on 9 Jul. 2012 and on 12 Jul. 2012, respectively. Both of these are incorporated herein by reference.

BACKGROUND

This disclosure relates generally to an airbag module. More particularly, this disclosure relates to strengthening portions of a case of an airbag module.

Airbag modules typically include a case providing a cavity. The case is anchored to the vehicle. An airbag and an inflator are positioned within the cavity, and then concealed by a cover. The case protects the undeployed airbag and directs the airbag when the airbag deploys. The airbag moves through a perforated tear seam in the cover during deployment. The deploying airbag generates considerable force.

SUMMARY

An example airbag case includes a floor that is configured to receive an airbag module. A wall extends away from the floor. A plurality of reinforcement features each without interruption from the floor to the wall.

An example knee airbag module includes a knee airbag and a case holding the knee airbag. The case has a floor, a first wall extending away from a first side of the floor, a second wall extending away from an opposing second side of the floor, and a plurality of gussets extending without interruption between the first wall and the floor. A cover is configured to engage the first wall and the second wall.

An example method of strengthening a knee airbag case includes forming gussets in an airbag case. The gussets extend without interruption from a floor of the airbag case to wall of the airbag case.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
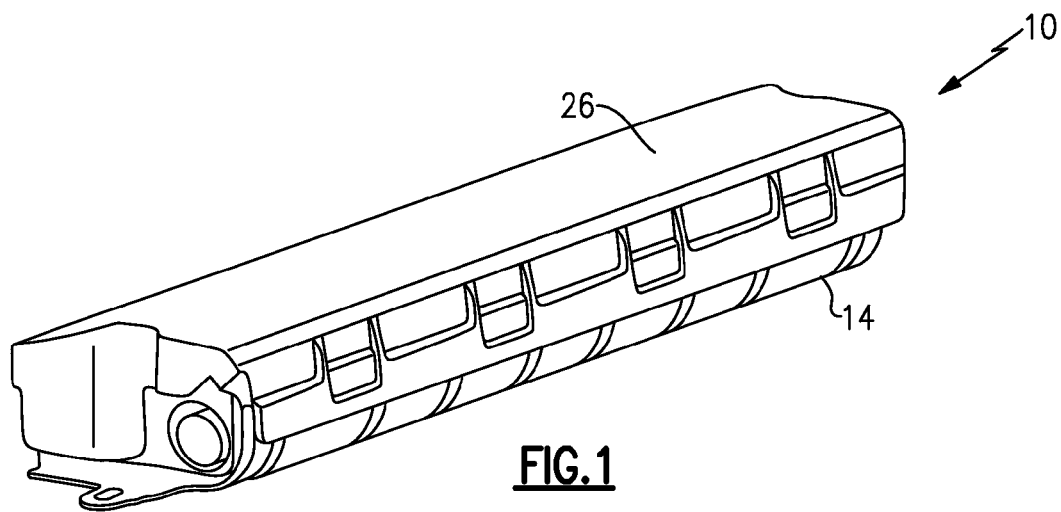
FIG. 1 shows a perspective view of an example airbag module.
Figure 2:
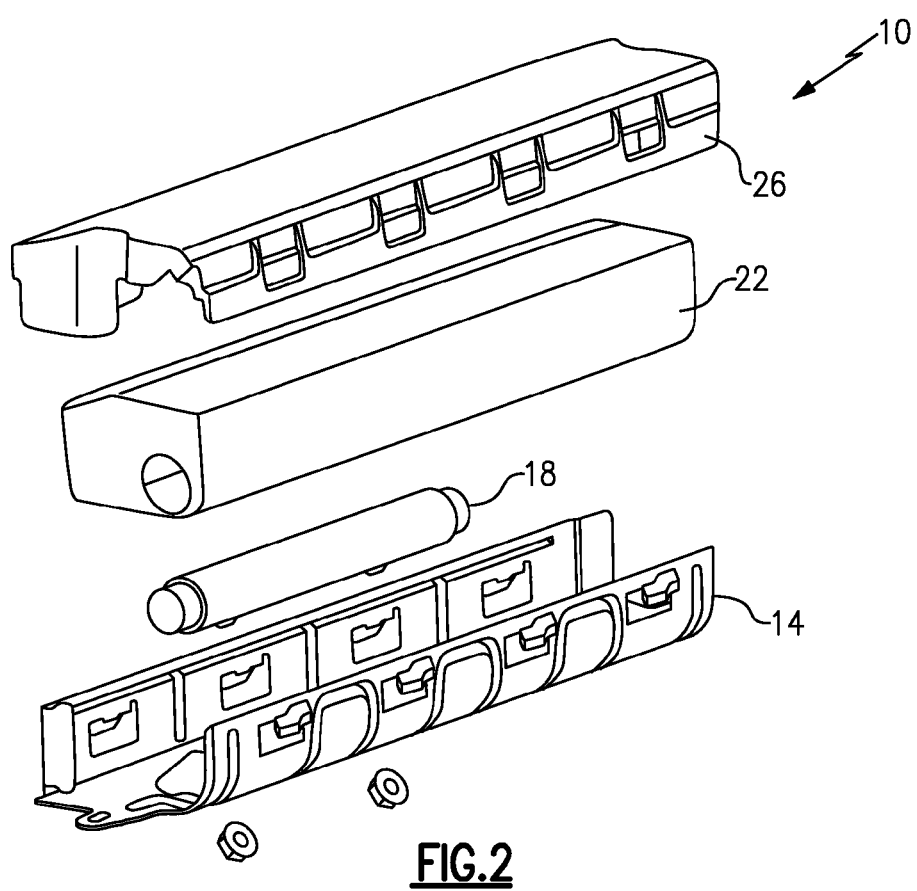
FIG. 2 shows an exploded view of the airbag module of FIG. 1.
Figure 3:
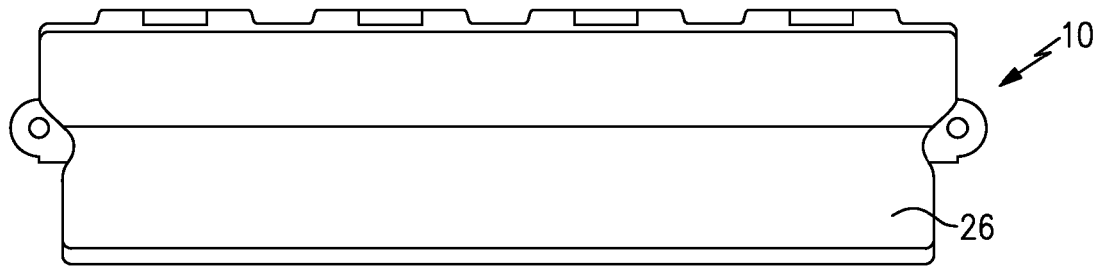
FIG. 3 shows a top view of the airbag module of FIG. 1.
Figure 4:
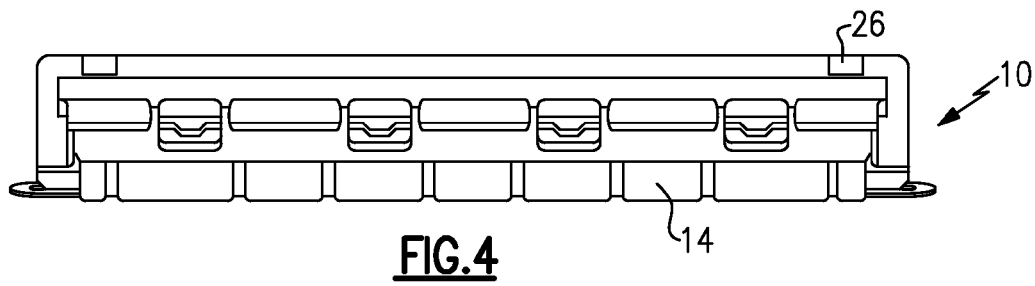
FIG. 4 shows a front view of the airbag module of FIG. 1.
Figure 5:
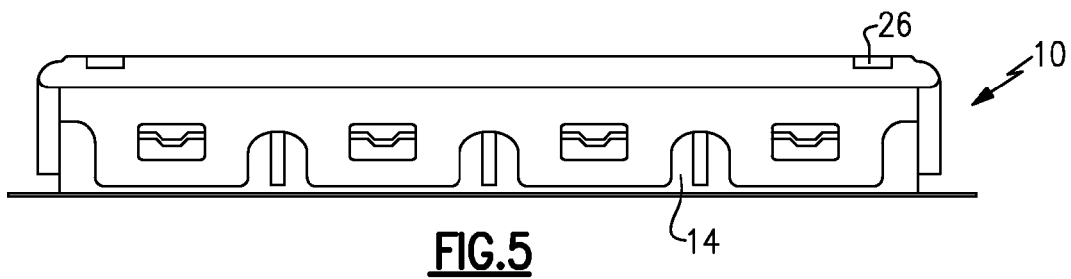
FIG. 5 shows a back view of the airbag module of FIG. 1.
Figure 6:
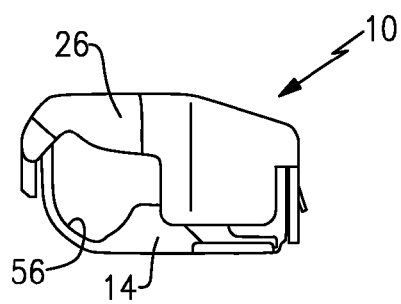
FIG. 6 shows a side view of the airbag module of FIG. 1.
Figure 7:
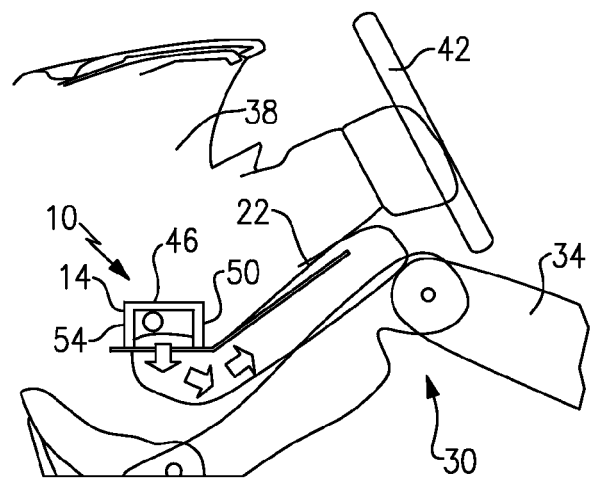
FIG. 7 shows the airbag module of FIG. 1 in a deployed position within a vehicle.

Referring to FIGS. 1-7, an example airbag module 10 includes a case 14, an inflator 18, an airbag 22, and a cover 26. The example airbag module 10 is a driver side knee airbag module. The airbag 22 deploys during a collision, for example. When deployed, the airbag 22 cushions a knee area 30 of an occupant 34.

The airbag module 10 is installed within a vehicle 38 below the steering wheel 42. The airbag 22 initially deploys from the knee airbag module 10 downwardly, and then moves upwardly toward the steering wheel 42 until fully deployed.

Although the example airbag module 10 is described as a driver side knee airbag, the airbag module 10 may be a passenger side knee airbag in another example, or an airbag other than a knee airbag, such as a side airbag, a seat airbag, a curtain airbags, etc.

Figure 8:
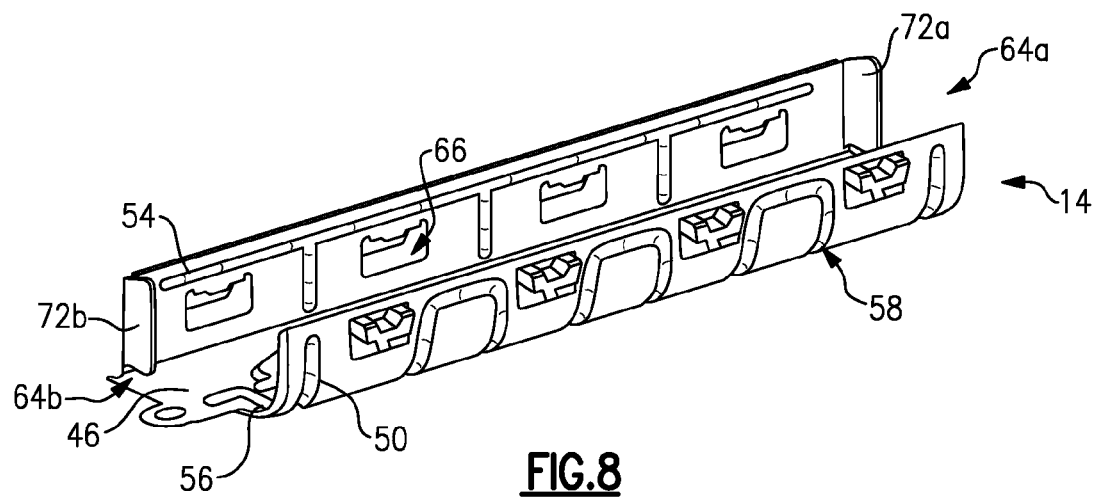
FIG. 8 shows a perspective view of a case of the airbag module of FIG. 1.
Figure 9:
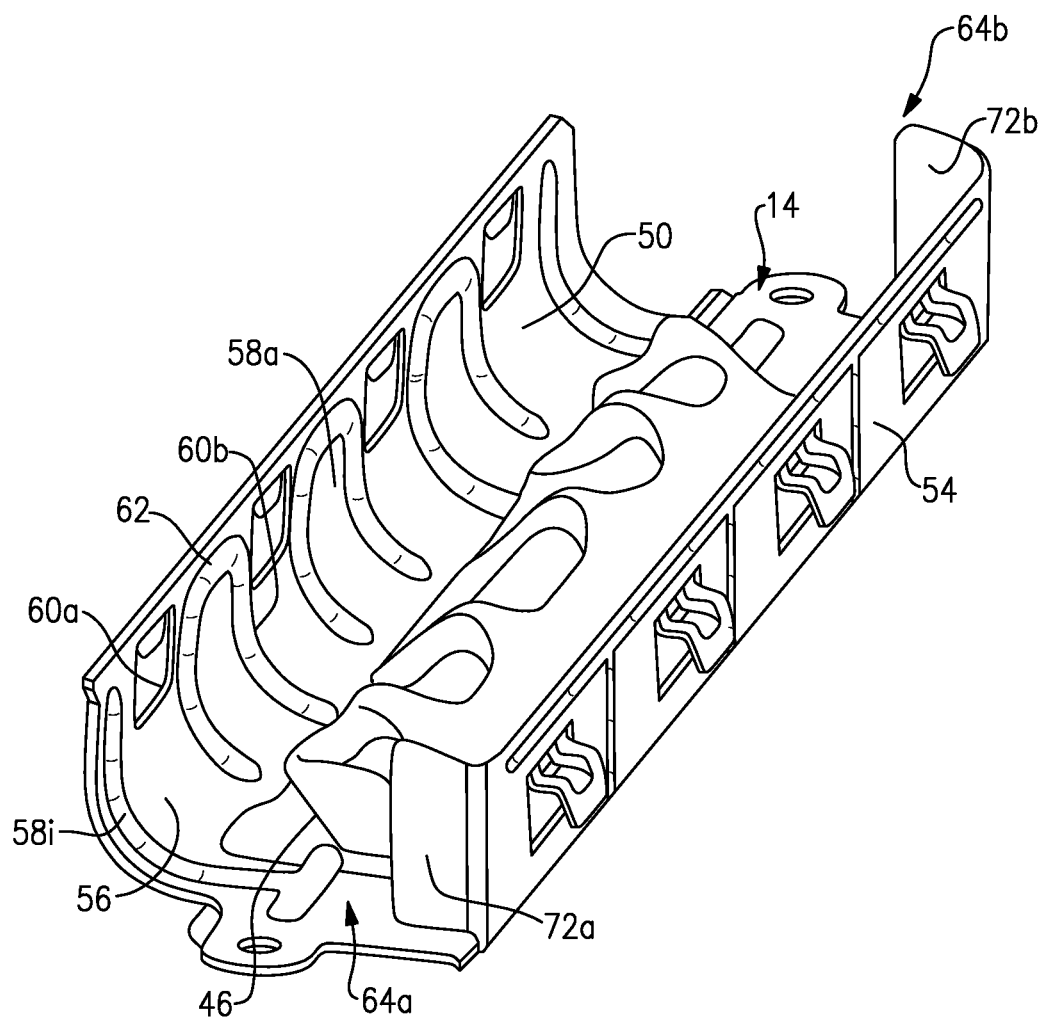
FIG. 9 is another perspective view of the case of FIG. 8.
Figure 10:
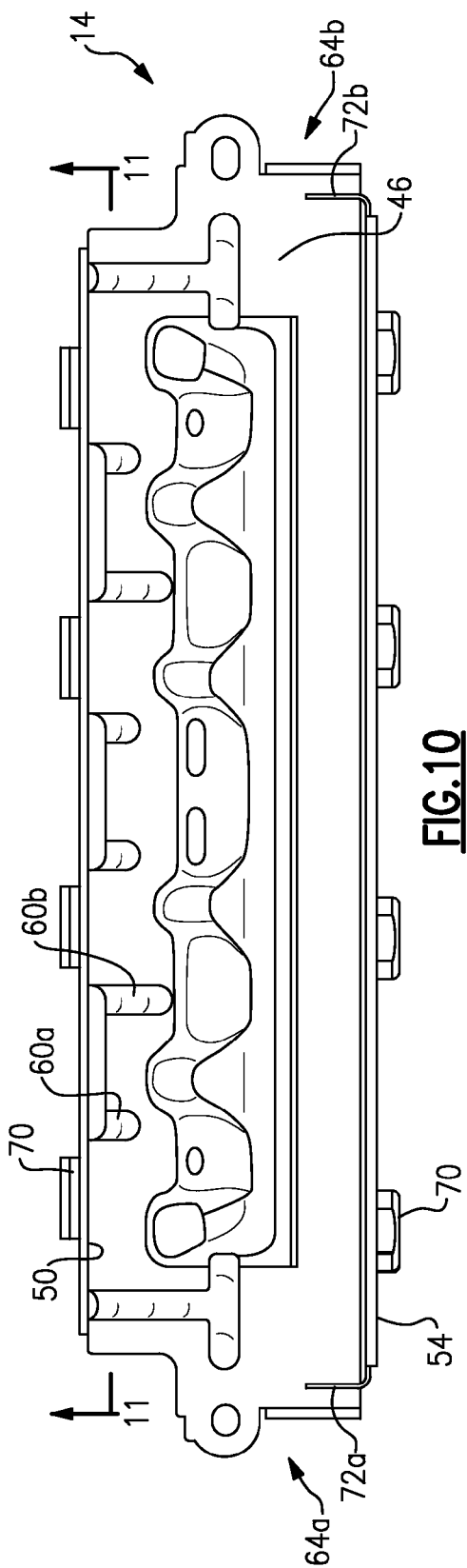
FIG. 10 shows an interior view of the case of FIG. 8.
Figure 11:
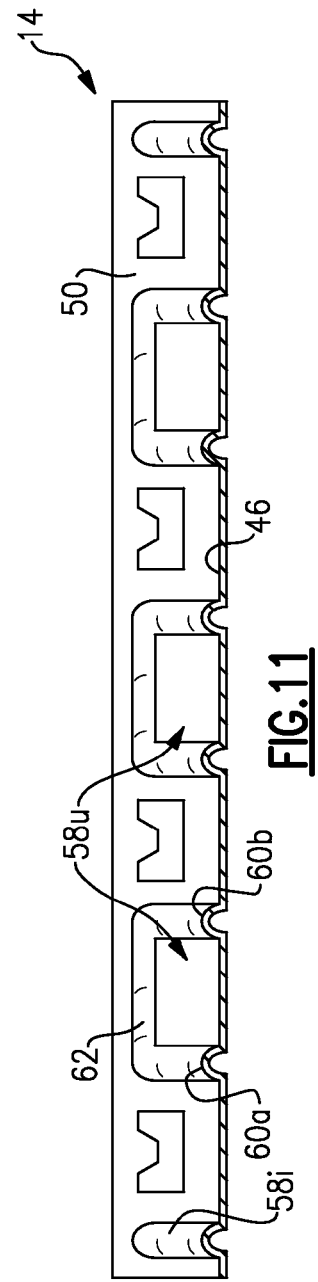
FIG. 11 is a cross-section view at line 11-11 in FIG. 9.

Referring now to FIGS. 8 to 10 with continuing reference to FIGS. 1 to 7, the case 14 of the example airbag module includes a floor 46, a first wall 50, and a second wall 54. The example first wall 50 may be considered a forward wall as the first wall 50 is closer to the occupant 34 of the vehicle. The second wall 54 is a rear wall. The first wall 50 and the second wall 54 extend from opposite sides of the floor 46. In this example, the first wall 50 and the floor 46 meet at a gradual radius 56. The second wall 54 meets the floor 46 at a sharper corner than the gradual radius 56. The first wall 50 and second wall 54 are considered flanges in some examples.

The airbag case 14 includes a plurality of reinforcement features that extend from the floor 46 to the first wall 50. The reinforcement features are gussets 58 in this example. In another example, the reinforcement features are inserts, triangular brackets, a separate piece, etc.

A portion of each of the gussets 58 is on the floor 46, and a portion of each of the gussets 58 is on the first wall 50. The gussets 58 extend continuously and without interruption from the floor 46 to the first wall 50. That is, the thickness and height of the gussets 58 remains relatively consistent.

Some of the example gussets 58u have a "U" profile each having legs 60a and 60b joined by a laterally extending portion 62. In the example gussets 58a, the legs 60a and 60b extend from the floor 46 to the first wall 50. The laterally extending portions are entirely on the first wall 50. Ends of the legs 60a and 60b are spaced from each other relative to the direction that the legs 60a and 60b extend.

Other gussets 58i have an "I" profile and no laterally extending portion 62.

The example gussets have a "C" shaped cross-section. In other examples, the cross-section may be triangular, square, etc. The cross-section, in these examples, is consistent along.

The gussets 58 strengthen the case 14, and especially the relationship between the first wall 50 relative to the floor 46. The gussets 58 help to absorb forces exerted against the first wall 50 with the floor 46. When strengthened, the first wall 50 more effectively withstands the force of the airbag 22 during deployment.

The gussets 58 are raised areas of the floor 46 and the front wall 50. The gussets may be stamped into the front wall 50, the front wall 50 then bent into its final design position.

Strengthening the first wall 50 utilizing the gussets 58 advantageously facilitates removal of other, more complex and heavier, features of the airbag case 14. For example, the case 14 includes no walls extending between the first wall 50 and the second wall 54. Openings 64a and 64b are provided at the laterally outer ends instead of walls. Wings 72a and 72b extend from the second wall 54.

Figure 12:
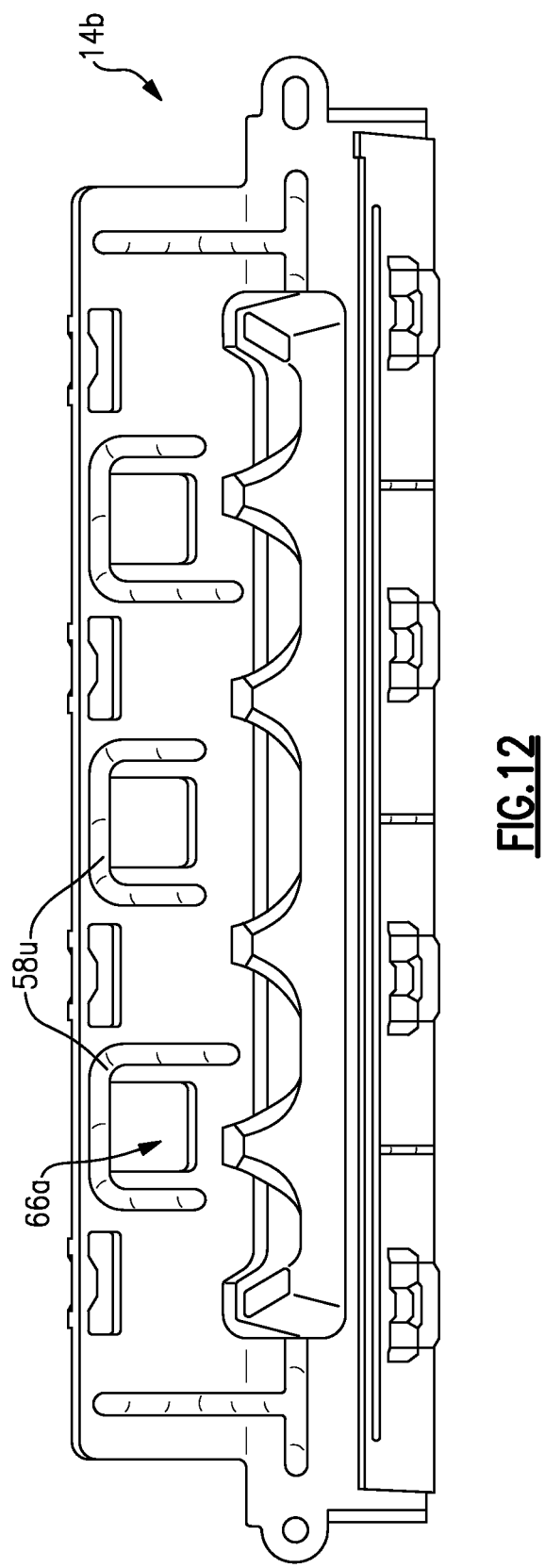
FIG. 12 shows another example case suitable for use within the module of FIG. 1.

In another example case 14b (FIG. 12), the wings 72a and 72b may be omitted.

In this example, the case 14 is a steel case formed as a single piece. The steel may be from 0.8 to 1.5 mm thick. As the example case is steel, the example case 14 is self grounding. In other examples, the case may be formed from multiple pieces.

The forces experienced by the second wall 54 during deployment are not typically as high as the forces experienced by the first wall 50. The second wall 54 includes windows 66, which reduces the overall amount of material in the case 14, and the overall weight of the case 14. The second wall 54 may include gussets 68.

In another example case 14b, the first wall 50 may include windows 66a that are placed within an interior of the gussets 58u.

In this example, the first wall 50 and the second wall 54 each include snaps tabs 70 configured to engage corresponding features on the cover 26. When the airbag 22 deploys, the force of the deploying airbag 22 causes a perforated tear seam in the cover 26 to break creating an opening for the airbag 22 to expand through the cover 26.

The inflator 18 and airbag 22 received by the example case 14 are both specific to a driver side. The same case 14 may be used to accommodate a passenger airbag. That is, the case 14 provides a common case design may be utilized for both driver side and passenger side knee airbags, which reduces overall complexity.

In addition to limiting relative movement of the first wall 50, the gussets 58 may prevent the portions of the case 14 engaging the cover 26 from deforming. The cover 26 may include sidewalls to prevent entry into the interior of the module 10 with the inflator 18 and the airbag 22 when the airbag 22 is not deployed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An airbag case, comprising:
   a floor that is configured to receive an airbag module;
   a wall extending away from the floor;
   a plurality of reinforcement features each extending without interruption from the floor to the wall; and
   a cover configured to engage the wall, the cover having a perforated seam to permit an airbag to move through the cover during deployment.

2. The airbag case of claim 1, wherein the airbag module is a knee airbag module.

3. The airbag case of claim 1, wherein the airbag case is configured for use on a passenger-side or a driver-side of a vehicle.

4. The airbag case of claim 1, wherein the plurality of reinforcement features each extend along a portion of the floor.

5. An airbag case, comprising:
   a floor that is configured to receive an airbag module;
   a wall extending away from the floor; and
   a plurality of reinforcement features each extending without interruption from the floor to the wall, wherein the plurality of reinforcement features comprise displaced areas of the wall and the floor.

6. The airbag case of claim 5, wherein the wall and the floor are steel.

7. The airbag case of claim 6, where in the steel is between 0.8 and 1.5 mm thick.

8. The airbag case of claim 5, wherein an airbag deploying from the airbag module contacts the wall.

9. The airbag case of claim 5, wherein at least some of the plurality of the reinforcement features extend without interruption from the floor to the wall and then to floor.

10. The airbag case of claim 5, wherein the floor is configured to be secured directly to a vehicle.

11. The airbag case of claim 5, wherein the reinforcement features comprise gussets.

12. An airbag case, comprising:
    a floor that is configured to receive an airbag module;
    a wall extending away from the floor; and
    a plurality of reinforcement features each extending without interruption from the floor to the wall, wherein the wall is a first wall, and a second wall extends from an opposing side of the floor.

13. The airbag case of claim 12, wherein the second wall provides windows.

14. A knee airbag module, comprising:
    a knee airbag;
    a case holding the knee airbag, the case having,
    a floor,
    a first wall extending away from a first side of the floor,
    a second wall extending away from an opposing, second side of the floor,
    a plurality of reinforcement features of the case, the plurality of reinforcement features each extend without interruption from the first wall to the floor;
    a cover configured to engage the first wall and the second wall; and
    the cover provides a perforated tear seam to permit movement of the knee airbag through the cover during deployment.

15. The knee airbag module of claim 14, wherein the case comprises steel.

16. The knee airbag module of claim 14, wherein the plurality of reinforcement features comprise ridges.

17. The knee airbag module of claim 14, wherein the plurality of reinforcement features comprise gussets.

18. The knee airbag module of claim 14, wherein the first wall interfaces with the first side along an axis, and the plurality of reinforcement features extend in a direction that is transverse to the axis.

19. The knee airbag module of claim 14, wherein the plurality of reinforcement features comprise displaced areas of the wall and the floor.

20. A method of strengthening a knee airbag case, comprising:
    forming reinforcement features in an airbag case, the reinforcement features extending without interruption from a floor of the airbag case to a wall of the airbag case; and
    securing a cover having a perforated tear seam to the airbag case.

21. The method of claim 20, wherein the airbag case is steel.

22. The method of claim 20, wherein the reinforcement features comprises gussets.

23. The method of claim 20, wherein the forming comprises recessing areas of the floor and the wall.

* * * * *

UNITED STATES PATENT AND TRADEMARK OFFICE
CERTIFICATE OF CORRECTION

| | | |
|---|---|---|
| PATENT NO. | : 8,641,082 B2 | Page 1 of 1 |
| APPLICATION NO. | : 13/615771 | |
| DATED | : February 4, 2014 | |
| INVENTOR(S) | : Vigeant et al. | |

It is certified that error appears in the above-identified patent and that said Letters Patent is hereby corrected as shown below:

IN THE CLAIMS:

Claim 1, column 3, line 44: insert --tear-- after "perforated"

Signed and Sealed this
Thirteenth Day of May, 2014

Michelle K. Lee
*Deputy Director of the United States Patent and Trademark Office*